Dec. 19, 1944.  E. W. SCHLIEBEN ET AL  2,365,494
COMPUTER FOR AIRCRAFT LOAD DISTRIBUTION
Filed Jan. 1, 1944  2 Sheets-Sheet 1
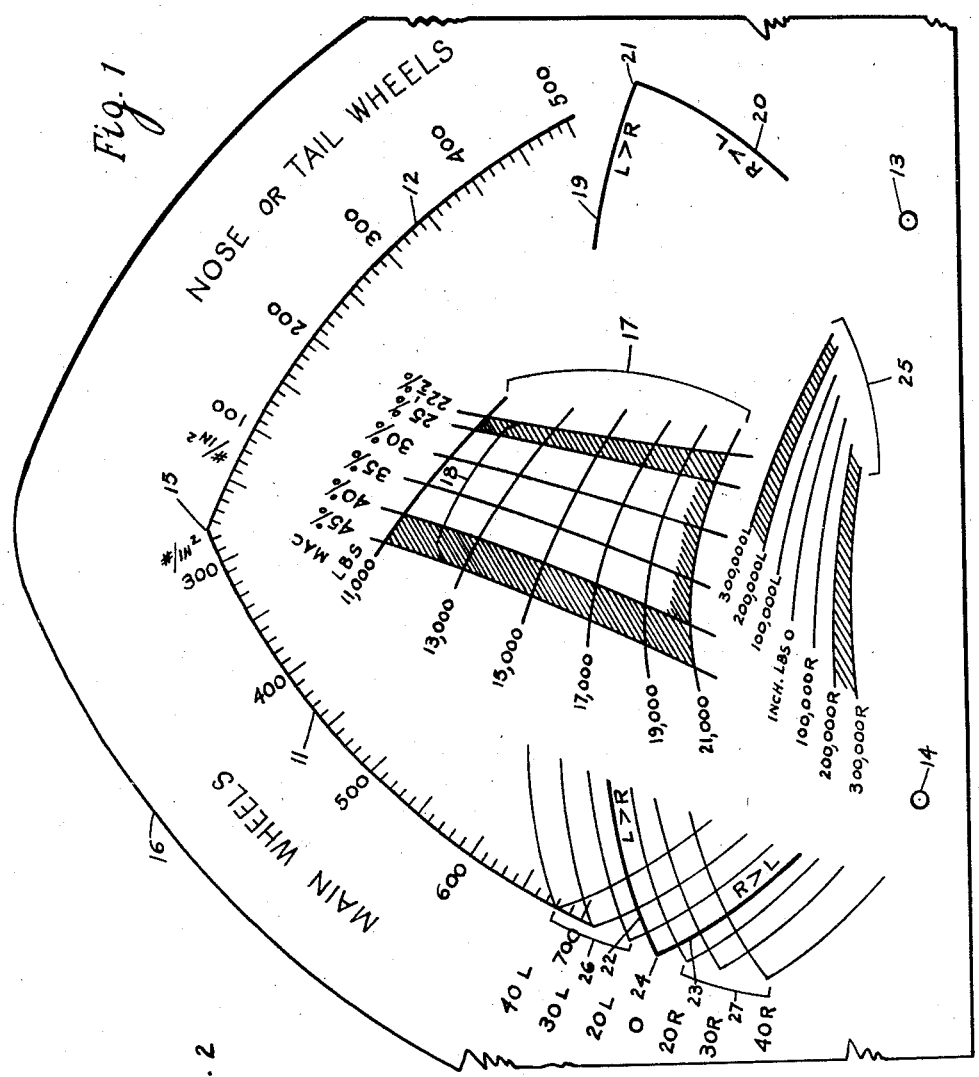
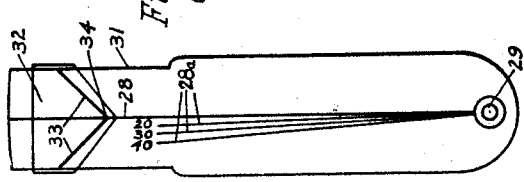
WILLIAM FRIEDMAN
ERNEST W. SCHLIEBEN
INVENTORS
BY Patented Dec. 19, 1944

2,365,494

UNITED STATES PATENT OFFICE 2,365,494

COMPUTER FOR AIRCRAFT LOAD DISTRIBUTION

Ernest W. Schlieben, Scarsdale, and William Friedman, New York, N. Y., assignors to York Research Corporation, New York, N. Y.

Application January 1, 1944, Serial No. 516,626

5 Claims. (Cl. 235—61)

This invention relates in general to an instrument for determining the position of the center of gravity in a loaded vehicle, and more particularly to a computing instrument for the determination of the horizontal position of the center of gravity of a loaded aircraft, giving at the same time an indication of the total weight of the load.

When loading an aircraft, it is of importance to enable the pilot and/or the freight handler at any time before the take-off to determine as quickly and accurately as possible the horizontal position of the center of gravity of the loaded craft. Means known for this purpose are generally complicated and require detailed tabulated data in which serious errors are sometimes not easily recognized.

The main object of the present invention is to provide for an instrument by means of which the horizontal position of the center of gravity of an aircraft can easily be established;

Another object of the invention is to provide for an instrument for the determination in an aircraft of the horizontal position of the center of gravity as well as of the total weight as soon as the location and magnitude of single weights or load reactions are known;

A further object of the invention is to render such an instrument simple and cheap in construction and easy to operate;

A still further object of the invention is to make the instrument compact in construction so that it takes up as little space as possible;

A further object of the invention is to create a computing instrument for the determination of the horizontal position of the center of gravity of an aircraft which is entirely independent of other parts of the aircraft and can easily be used at whichever place it is convenient.

Other objects and a fuller understanding of the invention may be had by referring to the following description and claims taken in conjunction with the accompanying drawings which shall, however, be in no way limitative but merely illustrative.

In the drawings:

Fig. 1 shows the line arrangement on the chart of a computing instrument according to the invention;

Fig. 2 shows one of the indicators with a runner as used in connection with the chart in Fig. 1;

Figure 3:
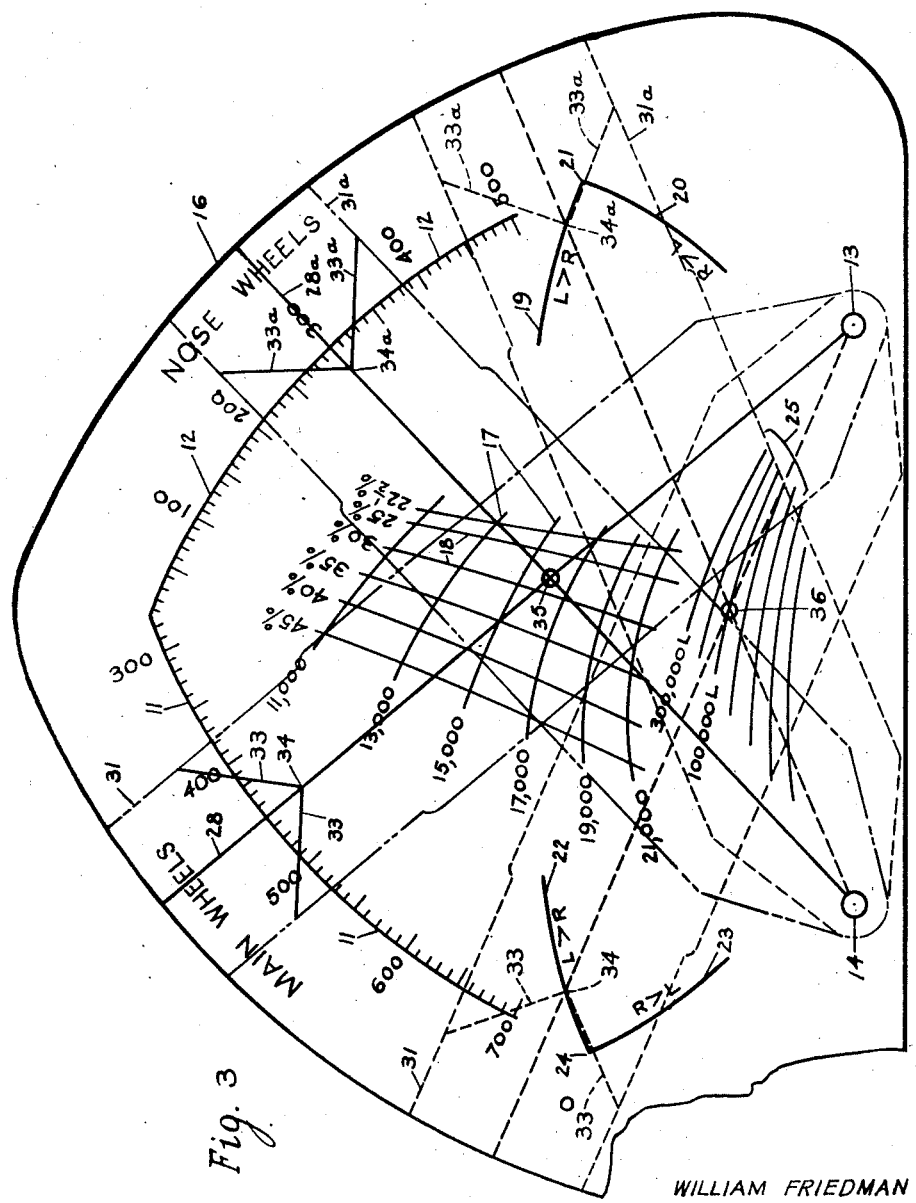
Fig. 3 shows an embodiment of an assembled computer with the indicators set in two different positions to illustrate the operation of the instrument.

In using the computing instrument described hereafter, it is necessary to know the magnitude and location of some reactions caused by the load or weight distributed throughout the aircraft; the most convenient reactions to be used for this purpose are the reactions in the supporting members of an aircraft which may be measured in any convenient way. For instance, the pressure variations due to load variations occurring in the shock struts of a land aircraft, or in certain parts of the floats of a sea craft may be transferred by mechanical, electrical, hydraulic, pneumatic, or any other known means to suitable indicating instruments inside the craft, or spring means, pressure gauges or the like may be employed to determine the wanted magnitudes from outside the craft.

In Fig. 1 of the drawings only the line arrangement of the computer chart is shown without any movable parts for the operation of the instrument, in order to give a clear picture of the lines themselves. The operation of the instrument will be explained hereafter in connection with Fig. 3 of the drawings.

Referring now to Fig. 1, the chart shown contains two coordinate lines 11 and 12 formed each as an arc about center points 13 and 14 respectively. Both coordinate lines have calibrations representing values proportional to the loads or pressures in the supporting members of an aircraft. As indicated in the example shown in the drawings, the coordinate line 11 represents values between 300 and 700 pounds per square inch for the main wheels while the coordinate line 12 represents values between zero and 500 pounds per square inch for the nose or tail wheels. These values are, in the embodiment shown, pressures in the shock struts of the supporting members but they could as well be indicated as actual weights. The two coordinate lines 11 and 12 are shown in such relative position that they intersect at a point 15 which results in a convenient shape of the chart and arrangement of the movable indicators as will be shown later on. The outline of the chart is indicated at 16, but the ends of the chart have been broken away in Fig. 1. The entire shape of the chart itself suitable for the chosen line arrangement is shown on the right side of Fig. 3.

A family of lines 17 is shown in the space between the coordinate lines 11 and 12. These are lines of equal total loads as plotted from the indications on the coordinate lines 11 and 12. Each intersection of radii drawn from the center points 13 and 14 to values on the coordinate lines 11 and 12 respectively represents a value of the total load on all wheels of the aircraft and the points of equal total loads are interconnected to form the "load lines" 17 as shown for loads from 11,000 to 21,000 pounds. It may be pointed out in this connection that the calibrations on the coordinate lines 11 and 12 indicate pressures or loads on the individual wheels or supporting members. Therefore, when two wheels are concerned, the value on the associated coordinate line, through which a radius has to be drawn as mentioned before, represents the mean pressure or load on the two individual wheels and must be doubled in order to give the total pressure or load on both wheels which is needed for the computation of the points of the load lines 17.

Another family of lines 18, intersecting lines 17, may be called "longitudinal load distribution lines" as they give an indication for the position of the center of gravity in the direction of the longitudinal axis of the aircraft. Such position may be given either in terms of distance from a fixed point, e. g. the nose of the aircraft or, as more usual, in terms of percent of the mean aerodynamic chord (MAC); the latter designation has been used in the drawings. Longitudinal load distribution lines from 22½% to 45% MAC are shown in Fig. 1. Each of these lines is a line of equal horizontal distances X of the center of gravity from a chosen fixed point according to the formula $$X = \frac{P_1 \times a + P_2 \times b}{P_1 + P_2}$$

$P_1$ and $P_2$ in this formula are the total weights on the nose (or tail) and main wheels respectively; $a$ and $b$ are the horizontal distances of these wheels from the chosen fixed point. If $P_1$ and $P_2$ are the pressures or loads indicated in the shock struts of an aircraft, these values have to be corrected for that portion of the weight of the landing gear which lies beneath the points of the supporting members at which the pressures are determined. For each value of $P_1$ and $P_2$ the radii drawn through these values from the center points 13 and 14 intersect in a point of the longitudinal load distribution lines 18. The lines are formed by interconnecting points of equal longitudinal distances.

In Fig. 1 some parts of the area covered by the families of lines 17 and 18 have been shaded. This shading indicates "danger-zones." The longitudinal center of gravity position for instance is according to Fig. 1 considered as safe for the operation of the aircraft as long as it lies in any area between the 25% and the 40% lines, while the operation of the aircraft would not be safe with the longitudinal position of the center of gravity outside these lines. The maximum safe total weight according to the shading in Fig. 1 is 20,000 pounds.

The computer according to the invention contains another family of lines which represent moments as means of indicating the lateral position of the center of gravity of the aircraft. Before, however, these lines can be described, it is necessary to explain another group of lines which serve for the construction of the "moment lines."

On the lower right side of the chart in Fig. 1, two curves 19 and 20 are shown. Both curves are equal to each other and symmetrical about a radius drawn from point 14 through the intersection point 21 of the curves 19 and 20. Point 21 is in this case located on an arc which forms the continuation of the coordinate line 12. The curves 19 and 20 are plotted so that the angular movement of a line going through the center point 14 and the intersection 21 and rotating around point 14 is for each chosen point on the curves 19 and 20 proportional to a certain amount of pressure difference between the two nose or tail wheels. The angular position of the line through point 14 is therefore an indication for the pressure difference or the moment between the two nose or tail wheels. Curve 19 is thereby, as indicated by L>R to be used when the load on the left hand wheel is larger than on the right hand wheel, while curve 20, as indicated by R>L is to be used when the load on the right hand wheel is larger than the one on the left hand wheel.

Another pair of similar curves 22 and 23 intersecting at a point 24 is plotted on the lower left side of the chart in Fig. 1. These curves are exactly the same as curves 19 and 20 with the difference that they are associated with the load differences or the moments on the main wheels and plotted symmetrically to a line going through the intersection point 24 and the center point 13 and rotating around the latter point.

The aforementioned family of "moment lines" 25 is plotted in the lower center of the chart. Each line is the connection of points of equal total moments as received from the single moments on the main and nose or tail wheels respectively. Such total moments are indicated through the intersections of radii through the center points 13 and 14 and the points found on the curves 19 or 20 and 22 or 23 respectively. These latter points are found as points of angular movements of lines 14—21 and 13—24 respectively (not shown in Fig. 1), proportional to pressure differences on the associated wheels as read from the indications on the coordinate lines 11 and 12. According to the position of the moment on either side of the longitudinal axis of the aircraft, either the curves "L>R" or "R>L" are used for this purpose. The readings on the hydraulic or similar instruments mentioned above, which show the pressures at the individual reaction points, are the indications for the left or right hand location of each individual moment.

In Fig. 1 moment lines are drawn for values from zero to 300,000 inch pounds on left and right side and shadings outside of the lines designated by "200,000" indicate that for safe operation of the aircraft the total moment should not exceed the aforementioned value. If the actual lateral position of the center of gravity is wanted as distance from the longitudinal axis of the aircraft, the moment read from lines 25 has to be divided by the total weight of the loaded aircraft as read from the load lines 17.

In order to take into account different velocities of side wind which obviously influences the magnitude of the moments, a set of curves 26 and 27 similar to the curves 22 and 23 is employed which are symmetrically located on both sides of the curves 22 and 23. These curves are designated by 26L, 30L and 40L and by 26R, 30R and 40R respectively, indicating so many miles per hour of a side wind coming from the left or right side respectively of the aircraft. If such winds prevail these curves are used instead of the curves 22 and 23 for the determination of the moment at the main wheels.

For the operation of the computer, two equal indicators are used which are rotatably hinged to the chart at 13 and 14 but not shown in Fig. 1. Fig. 2 shows one of the indicators in half size as compared with the scale used for Fig. 1. The indicator has a central or zero hairline 28 going through the hinge point 29 around which the indicator rotates when assembled with the chart. Three other radial hairlines 28a are shown forming angles of different size with the hairline 28. These hairlines are marked for various velocities (20, 30 and 40 miles per hour) of head or tail wind and are used for the determination of the longitudinal position of the center of gravity and of the total weight in case of head or tail wind.

The end 31 of the indicator, opposite its hinge end, is somewhat narrower than the rest of the indicator and forms a guide for a runner 32 which is adapted to slide radially along the narrow end of the indicator. The runner is calibrated with two hairlines 33 which intersect in a point 34 on the zero hair line 28 and form equal angles with the latter hair line.

While the chart itself may be made out of any suitable material, the indicators and the runners, if designed as shown in the drawings must be made out of transparent, e. g. plastic material to enable the reading of all hair lines against the chart.

The operation of the computer according to the invention can best be explained from Fig. 3 which is an assembly of the chart with the two indicators and shows the indicators in two different positions to which they have to be set in order to determine the horizontal position of the center of gravity of a loaded aircraft. The computation shown and hereafter described relates to a land aircraft with two main and two nose wheels but, as will be shown later on, the computer can as well be used and a similar procedure followed for an aircraft with only three supporting members. Of course any other kind of load reactions may be used to enable the use of the computer.

In Fig. 3 the same reference numbers have been employed as in Figs. 1 and 2. Only the reference numbers for the parts of the second indicator have been distinguished by the addition of the letter "a" as only one of the indicators has been shown in the previous views. Some of the designations and the shading have been omitted in Fig. 3 to make the drawings easier understandable. For the same reason the wind hair lines have been omitted on the indicators and only the zero hair line has been shown, also the wind curves 26 and 27 from Fig. 1 have been omitted in Fig. 3.

In the example illustrated in Fig. 3 it has been assumed that the indicating instruments associated with the different shock struts show pressures per square inch of 410 and 490 pounds respectively on the two main wheels, and of 270 and 330 pounds respectively on the two nose wheels of the four wheeled aircraft under consideration. The average pressure per square inch on each main wheel is therefore 450 pounds, the average pressure on each nose wheel is 300 pounds. The indicators 31 and 31a which are shown in phantom lines in Fig. 3 are set so that their zero hair lines 28 and 28a (shown in full) cross the values 450 and 300 of the coordinate lines 11 and 12 respectively. The runners on these indicators are set so that their hair lines 33 and 33a (shown in full) cross the values 410 and 490 on coordinate line 11 and the values 270 and 330 on coordinate line 12.

In this position of the indicators, the zero hair lines 28 and 28a intersect in a point 35 which gives a reading of 16,000 pounds when read against the load lines 17, and a reading of 28% MAC when read against the longitudinal load distribution lines 18.

The indicators are now rotated (without moving the runners with respect to the indicators) until the intersections 34 and 34a of the runner hair lines fall on curves 22 and 19 respectively. In this case it has been assumed that at the main wheels as well as at the nose wheels the larger load is on the left side of the longitudinal axis of the aircraft. Would the larger load on the main wheels for instance be on the right side, then curve 23 would have to be used instead of curve 22.

The indicators 31 and 31a as well as the different hair lines are shown in their second positions with broken lines. Their zero hair lines intersect at a point 36 which indicates a moment of 100,000 inch pounds to the left when read against the moment lines 25. The actual transverse center of gravity position can be found in inches from the center line of the aircraft by dividing the moment by the weight $$\frac{100,000}{16,000} = 6.25''$$

If the instrument is to be used for an aircraft with only three supporting members the runner 32 (not shown in Fig. 3) on the indicator 31a would have to be set so that the intersection 34a of the hair lines 33a coincides with the coordinate line 12. In this case the zero hair line 28a would run through the intersection 21 of the curves 19 and 20 for the reading of the moment. It is obvious that in the case of only three supporting members the runner on the indicator 31a could as well be omitted.

Many variations in the construction of the computing instrument are possible within the scope of the invention. It is furthermore obvious that all the characteristics of the computer remain the same whether the aircraft for which the computer shall be used has main and nose wheels or main and tail wheels. Therefore wherever the term "nose wheels" or "tail wheels" is used within this application both terms have to be considered as equivalent and can be replaced by each other. Furthermore, the term "grounded" used in the claims should be understood in its broadest sense, meaning as well grounded on land as on water.

What we claim is:

1. In an instrument for the determination of the horizontal position of the center of gravity of an aircraft by means of load reactions caused by the weight of the grounded aircraft: a chart having two coordinate lines, each of said coordinate lines forming a circular arc around a different center point and being calibrated according to values indicating the magnitude of said load reactions; two movable indicators on said chart, each associated with a different one of said coordinate lines and adapted to rotate around the center point of its associated coordinate line and having an indicating line radially extending along each indicator, said indicating lines intersecting at each position of said indicators within the range of operation of the instrument; a runner on at least one of said indicators, said runner being adapted to slide radially on said indicator and having two intersecting hair lines, said hair lines being so arranged that the angle between them would be bisected by a line passing through their intersection and the center point of the indicator on which said runner slides; a family of lines on an area of the chart over which the intersections of said indicating lines move when the indicators are operated, each line of said family representing points of equal longitudinal positions of the center of gravity of the aircraft as determined by the intersections of said indicating lines when set according to the given load reactions on said two coordinate lines; a second family of lines on said same area of the chart, each line of said second family representing values of the moments around the longitudinal axis of said aircraft as caused by said load reactions, said moments being determined by the intersections of said indicating lines when said indicators are set in accordance with the values of said load reactions, the setting of the indicators being determined by two pairs of curves on said chart within the operating area of said indicators, each pair of curves being associated with a different one of said indicators and enabling a setting of said indicators so that the angle between each indicating line and a reference line is always proportional to the difference between the values on the associated coordinate line to which the hair lines on said runners had been set.

2. An instrument as claimed in claim 1, said instrument having a third family of lines on an area of the chart over which the intersections of the indicating lines move, the lines of said third family representing each points of equal total weights as determined by the intersections of said indicating lines when said lines are set according to the load reactions given on said two coordinate lines.

3. An instrument as claimed in claim 1, said instrument having a number of further pairs of curves similar to those claimed in claim 1 and arranged symmetrically to both sides of one of said pairs of curves claimed in claim 1, said further pairs of curves representing lines to which the indicators can be set for the determination of said moments when side wind on the aircraft has to be taken into account.

4. An indicating instrument as claimed in claim 1, said indicating instrument having on said indicators besides said indicating line claimed in claim 1 at least one further radially extending indicating line, said further indicating lines representing wind lines which are used for the determination of the longitudinal position of the center of gravity and of the total weight when wind in longitudinal direction is affecting the balance of the aircraft.

5. A computer for the determination of the horizontal position of the center of gravity of an aircraft from the known load reactions in four ground supporting members, comprising: a flat base, a chart on said flat base, said chart comprising two arc shaped coordinate lines calibrated according to values indicating the magnitude of said load reactions, two transparent indicators hinged at and rotatable around the center points of said arc shaped coordinate lines, radial indicating lines on said indicators, said indicating lines intersecting when said indicators are rotated within the range of operation of the computer, a transparent runner radially slidable on each of said indicators, each of said runners having two intersecting hair lines, two families of lines on said chart within the area of the intersections of said indicating lines, said families of lines being indications for the longitudinal and the lateral position of the center of gravity respectively of the aircraft, and two pairs of curves on said chart within the operating area of said indicators, each one of said pairs of curves being associated with a different one of said indicators and enabling a setting of said indicators proportional to the differences between the load reactions indicated on the respective coordinate lines.

ERNEST W. SCHLIEBEN.
WILLIAM FRIEDMAN.